US011906026B2

(12) United States Patent
Joo

(10) Patent No.: US 11,906,026 B2
(45) Date of Patent: Feb. 20, 2024

(54) FRICTIONAL WAVE REDUCER

(71) Applicant: C AND M ROBOTICS CO., LTD., Seoul (KR)

(72) Inventor: Sang Wan Joo, Gyeonggi-do (KR)

(73) Assignee: C AND M ROBOTICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/417,716

(22) PCT Filed: Mar. 5, 2021

(86) PCT No.: PCT/KR2021/002716
§ 371 (c)(1),
(2) Date: Jun. 23, 2021

(87) PCT Pub. No.: WO2021/177766
PCT Pub. Date: Sep. 10, 2021

(65) Prior Publication Data
US 2023/0258255 A1   Aug. 17, 2023

(30) Foreign Application Priority Data

Mar. 6, 2020 (KR) .................. 10-2020-0028288
Jun. 15, 2020 (KR) .................. 10-2020-0072464

(51) Int. Cl.
*F16H 49/00* (2006.01)
*B25J 17/00* (2006.01)
(Continued)

(52) U.S. Cl.
CPC .......... *F16H 49/001* (2013.01); *B25J 9/1025* (2013.01); *B25J 17/00* (2013.01); *F16C 17/04* (2013.01); *F16H 2049/003* (2013.01)

(58) Field of Classification Search
CPC ........ F16H 49/001; B25J 17/00; B25J 9/1025
(Continued)

(56) References Cited

U.S. PATENT DOCUMENTS 3,178,963 A * 4/1965 Walton .................. F16H 49/001
74/640
3,187,605 A * 6/1965 Bernard ................ F16H 49/001
74/640
(Continued)

FOREIGN PATENT DOCUMENTS

CN          2634199 Y      8/2004
JP       2012251603 A     12/2012
(Continued)

*Primary Examiner* — William C Joyce
(74) *Attorney, Agent, or Firm* — Park Law Firm

(57) ABSTRACT

The present disclosure relates to a frictional wave reducer mainly used for industrial robot joints and having an operating principle modified from that of a conventional strain wave gearing, which includes a wave generator having a conic pressurizing face on the outermost side, a toothless flex spline having a conic friction tube in which the wave generator is accommodated with the conic pressurizing face inscribed in the conic friction tube, and a toothless circular spline accommodating the toothless flex spline and having an internal conic friction face in which the conic friction tube is inscribed at a plurality of axially symmetrical points to form an internal friction wheel with the toothless flex spline. Accordingly, disadvantages of the conventional strain wave gearing are overcome to provide a reducer having high productivity and high rotation accuracy without generation of vibration and noise.

5 Claims, 14 Drawing Sheets

(51) Int. Cl.
*F16C 17/04* (2006.01)
*B25J 9/10* (2006.01)

(58) Field of Classification Search
USPC .......................................................... 74/640
See application file for complete search history.

(56) References Cited

U.S. PATENT DOCUMENTS 3,796,898 A * 3/1974 Kleinwaechter ...... F16H 49/001
74/640
4,286,476 A * 9/1981 Stiff ..................... F16H 49/001
74/395

FOREIGN PATENT DOCUMENTS

| | | | |
|---|---|---|---|
| JP | 2016194315 A | 11/2016 | |
| JP | 2019196826 A | 11/2019 | |
| JP | GP21020KR | 8/2022 | |
| KR | 1020150029834 A | 3/2015 | |
| KR | 10-2020-0028288 A | 6/2021 | |
| WO | 2019049295 A1 | 3/2019 | |

* cited by examiner (Prior Art)

(Prior Art)

FRICTIONAL WAVE REDUCER

BACKGROUND OF THE DISCLOSURE

Field of the Disclosure

The present disclosure relates to a reducer mainly used for joints of industrial robots and, more specifically, to a frictional wave reducer having an operating principle modified from that of a conventional strain wave gearing.

Related Art

In general, reducers applied to fields in which operation precision is required, such as industrial robots, machine tools, and semiconductor processes include a strain wave gearing, an RV reducer, a planetary gear reducer, etc.

Among these, the strain wave gearing also called Harmonic Drive™ has a simple structure while achieving a high reduction gear ratio of 1:30 to 1:320 with high precision and is advantageous for miniaturization and weight reduction and thus it has been adopted and widely used for industrial robots.

A conventional strain wave gearing 10 includes a wave generator 11, a flex spline 12, and a circular spline 13 as key components, as illustrated in FIG. 1. When the oval wave generator 11 rotating integrally with a motor shaft rotates, the elastic flex spline 12 enclosing the wave generator 11 is deformed in accordance with the shape of the rotating wave generator 11, as illustrated in FIG. 2. In addition, the flex spline 12 has a difference of a specific number of teeth from that of the circular spline 13 engaged with the outer circumference thereof, and thus a reduction gear ratio at which the flex spline 12 rotates in a reverse direction at an angle corresponding to the difference of the number of teeth is achieved at the time of unit rotation of the wave generator 11.

However, the strain wave gearing 10 having this principle has problems of difficulty in manufacturing and high costs because design and precision processing for forming teeth in the flex spline 12 are required despite the aforementioned advantages.

Furthermore, there are problems that rotation accuracy decreases and vibration and noise are generated when formation of the teeth causes abrasion due to friction between tooth surfaces or processing error or shape error of the teeth is present.

Moreover, formation of the teeth inevitably involves backlash and thus the teeth have rotation clearance.

CITED REFERENCE

Korean publication of unexamined patent application No. 2018-0127794 (2018.11.30)
Korean publication of unexamined patent application No. 2017-0139191 (2017.12.19)
Korean Patent No. 2033409 (2019.10.11)

SUMMARY

Accordingly, an object of the present disclosure is to provide a frictional wave reducer having high productivity and high rotation accuracy without generation of vibration and noise by modifying the operating principle of the conventional strain wave gearing to overcome the disadvantages of the conventional strain wave gearing.

To accomplish the object, the present disclosure provides a frictional wave reducer including a wave generator having a conic pressurizing face on the outermost side, a toothless flex spline having a conic friction tube in which the wave generator is accommodated with the conic pressurizing face inscribed in the conic friction tube, and a toothless circular spline accommodating the toothless flex spline and having an internal conic friction face in which the conic friction tube is inscribed at a plurality of axially symmetrical points to form an internal friction wheel with the toothless flex spline.

Here, the frictional wave reducer may further include a pressurizing means for generating frictional force between the conic friction tube and the internal conic friction face by pressurizing the wave generator in an axial direction.

In this case, the pressurizing means may include a plug which pressurizes the wave generator by means of a thrust bearing.

Further, the frictional wave reducer may further include an intermediate plate for motor mounting which is combined with one end of the circular spline in the axial direction and accommodates the plug, and an outer circumferential face of the plug and an inner circumferential face of the intermediate plate are combined with each other through screw joining such that pressurizing force applied by the plug to the wave generator is controllable.

Here, the plug may include a rim having an outer circumferential face combined with the inner circumferential face of the intermediate plate through screw joining, an elastic flange inwardly extending from an inner circumferential face of the rim, and a hub formed at an inner edge of the elastic flange and pressurizing the thrust bearing through one edge in the axial direction, and the elastic flange is elastically deformed in an opposite axial direction in proportion to the pressurizing force through the hub.

Further, the plug may pressurize the thrust bearing by means of a spring, and the spring may be elastically compressively deformed in the axial direction in proportion to the pressurizing force.

The frictional wave reducer may further include a pulling means for pulling the wave generator in the axial direction to generate frictional force between the conic friction tube and the internal conic friction face instead of the pressurizing means.

In this case, the pulling means may include an extension shaft extending from the wave generator in the axial direction and passing through the center of the flex spline, a bearing rotatably supporting the extension shaft with respect to the flex spline, and a plug combined with the extension shaft to come into contact with the bearing to be supported in the axial direction.

Here, an inner circumferential face of the plug and an outer circumferential face of the extension shaft may be combined with each other through screw joining such that tension applied by the plug to the wave generator is controllable.

Furthermore, the plug may include a hub having an inner circumferential face combined with the outer circumferential face of the extension shaft through screw joining, an elastic flange outwardly extending from an outer circumferential face of the hub, and a rim formed at an outer edge of the elastic flange and supported by the bearing through one edge in the axial direction, and the elastic flange may be elastically deformed in an opposite axial direction in proportion to the tension through the hub.

The plug may be supported by the bearing by means of a spring, and the spring may be elastically compressively deformed in proportion to the tension.

In addition, the wave generator may include a wave generating cam having the conic pressurizing face on the outmost side, and a wave generating cam shaft detachably combined with the wave generating cam in the axial direction and having the extension shaft.

DESCRIPTION OF EXEMPLARY EMBODIMENTS

Figure 1:
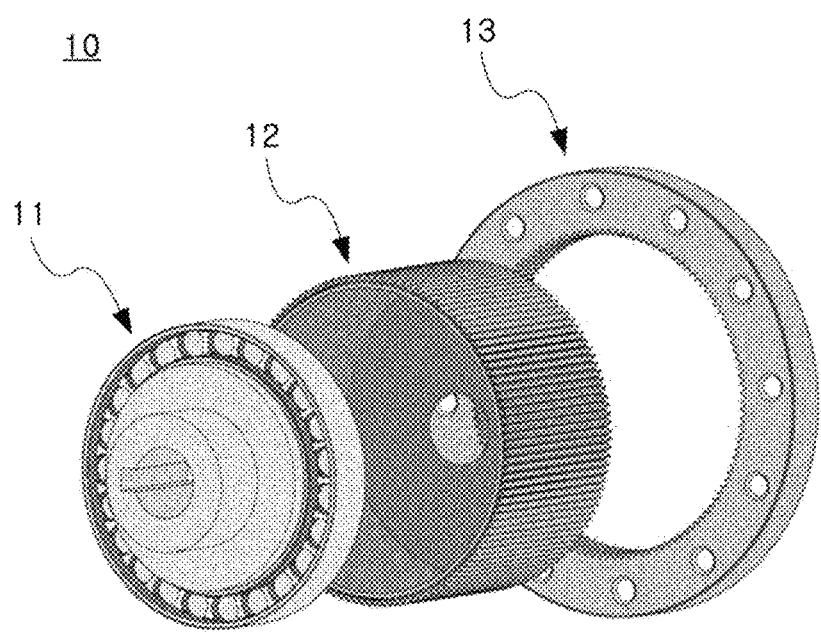
FIG. 1 is an exploded perspective view of the principal part of a conventional strain wave gearing.
Figure 2:
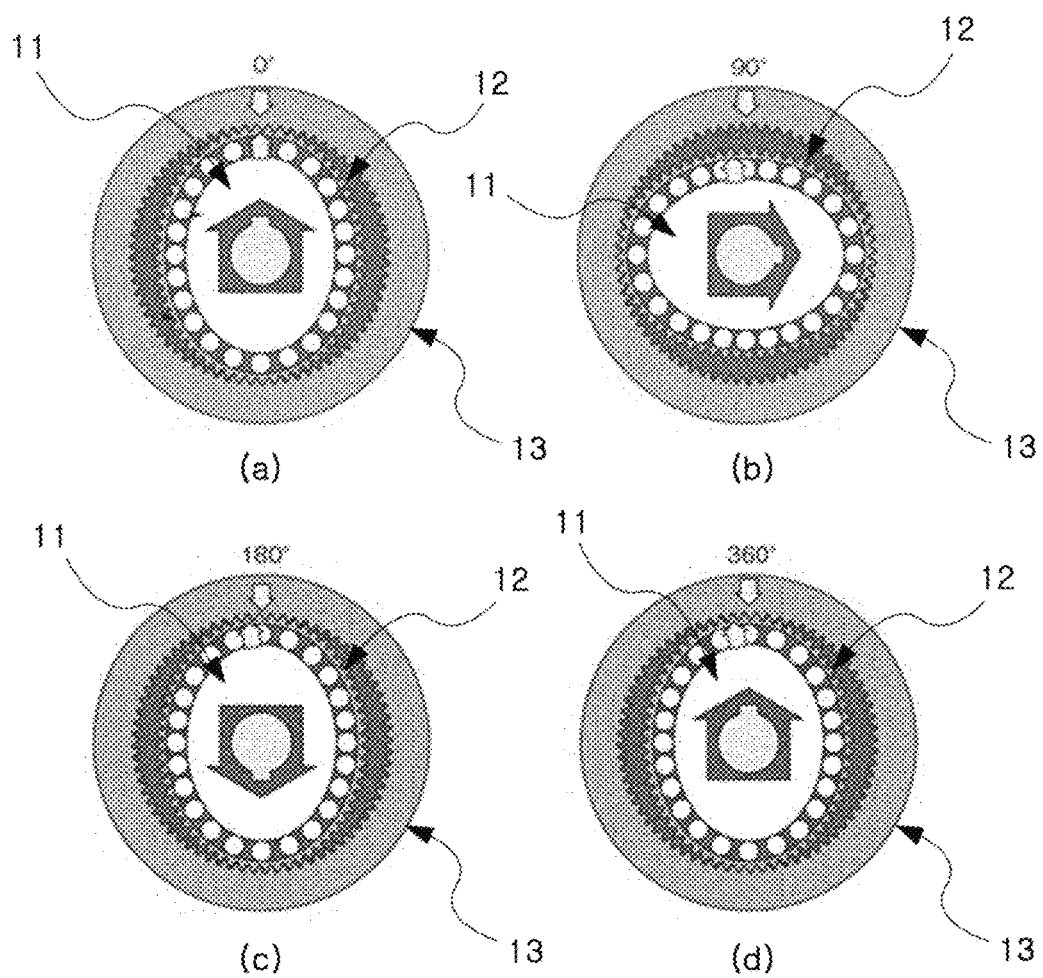
FIG. 2 is a plan view illustrating operation stages in an assembled state of the strain wave gearing of FIG. 1.
Figure 3:
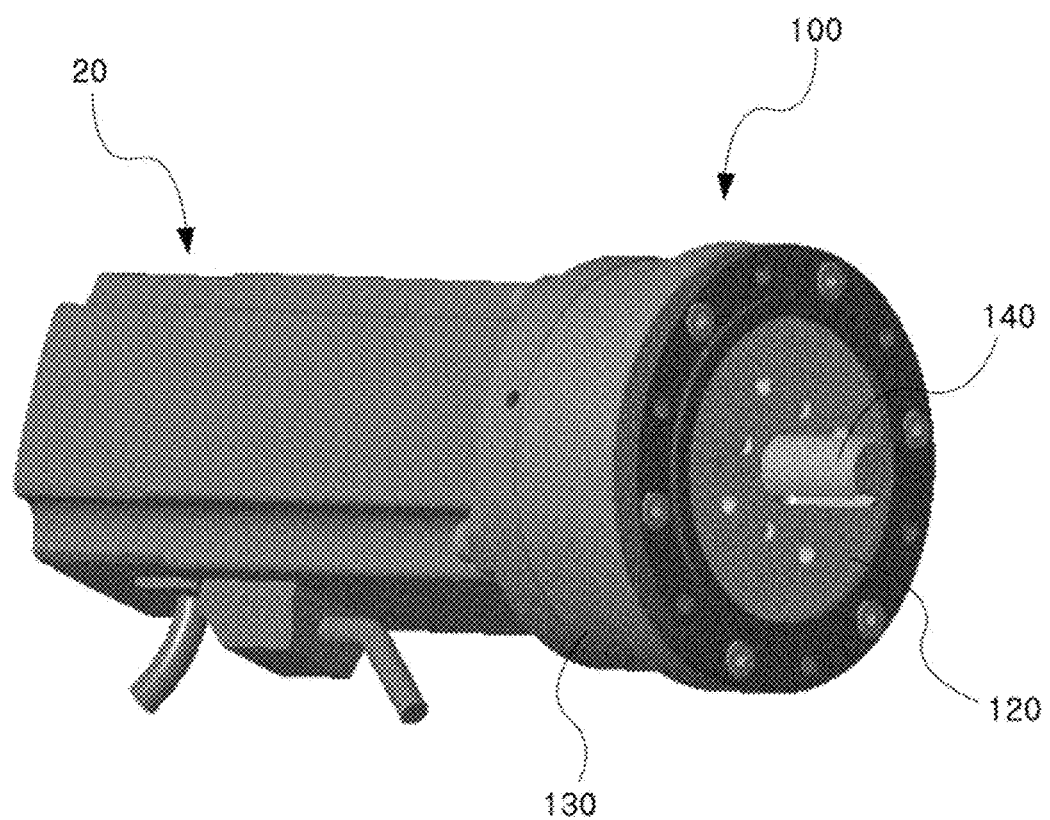
FIG. 3 and FIG. 4 are a perspective view and a cross-sectional view of a combination of a frictional wave reducer and a motor according to a first embodiment of the present disclosure.
Figure 4:
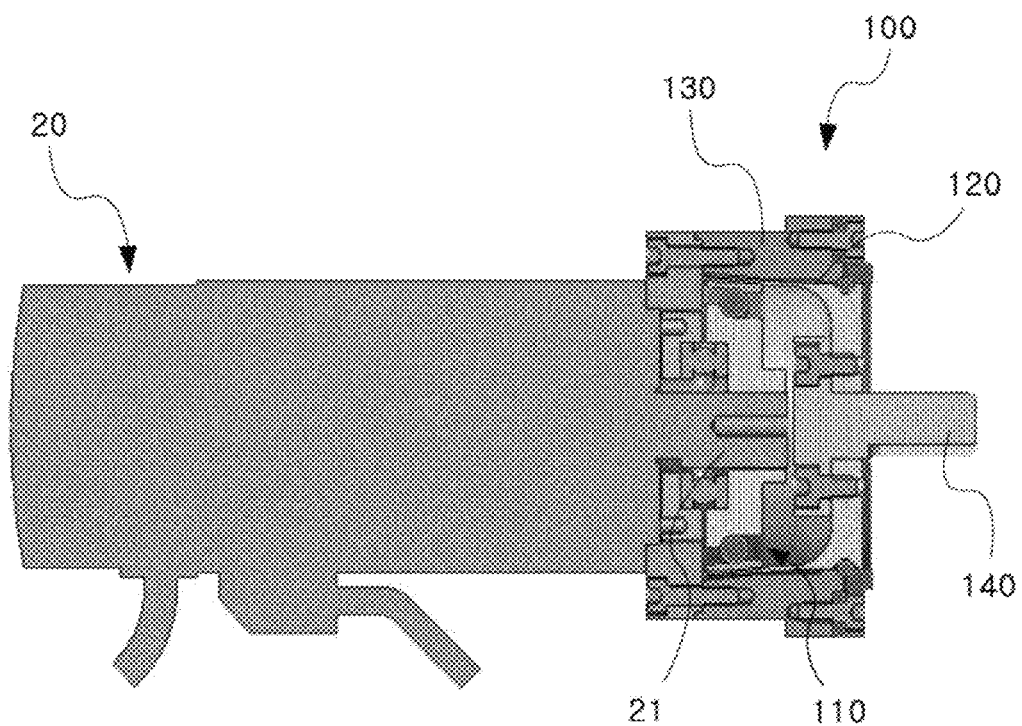

A frictional wave reducer 100 according to a first embodiment of the present disclosure is substantially the same as the conventional strain wave gearing (refer to 10 in FIG. 1 and FIG. 2) in that a wave generator 110 is combined and integrally rotates with a drive shaft 21 of a motor 20 combined with one side of the frictional wave reducer 100, and an elastic flex spline 120 enclosing the wave generator 110 is deformed in accordance with the shape of the rotating wave generator 110 (refer to FIG. 2) and rotates at a specific rate in a reverse direction with respect to a circular spline 130 on the outer side thereof to achieve a reduction gear ratio of an output shaft 140, as illustrated in FIG. 3 and FIG. 4.

However, the frictional wave reducer according to the present embodiment differs from the conventional strain wave gearing in that the flex spline 120 and the circular spline 130 according to the present embodiment are in a frictional combination relationship according to surface-to-surface contact whereas the conventional flex spline (12 in FIG. 1) and circular spline (13 in FIG. 1) are gearing with each other.

Figure 5:
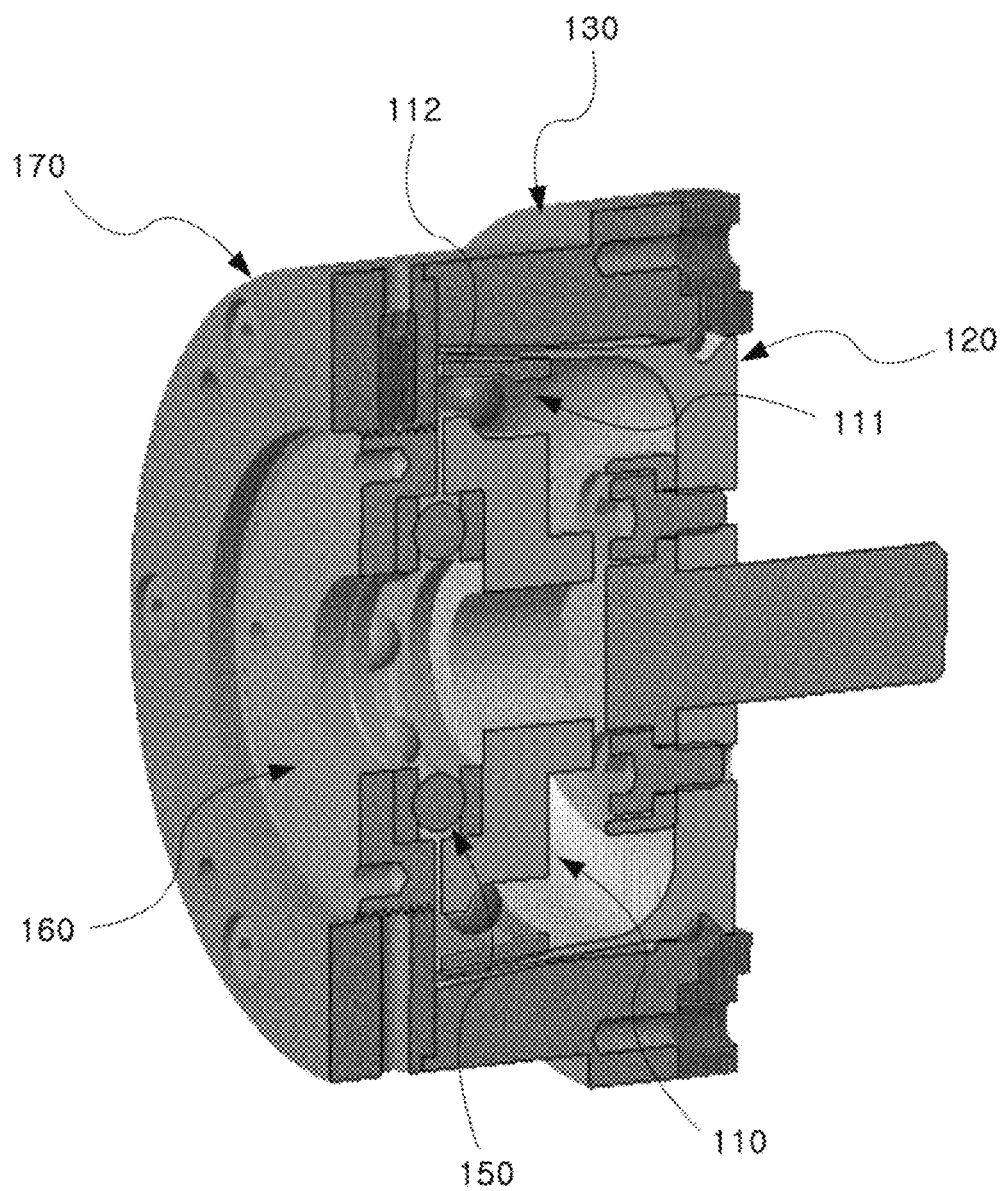
FIG. 5 and FIG. 6 are an enlarged perspective view and cross-sectional view illustrating a strain wave gearing separated from FIG. 4.
Figure 6:
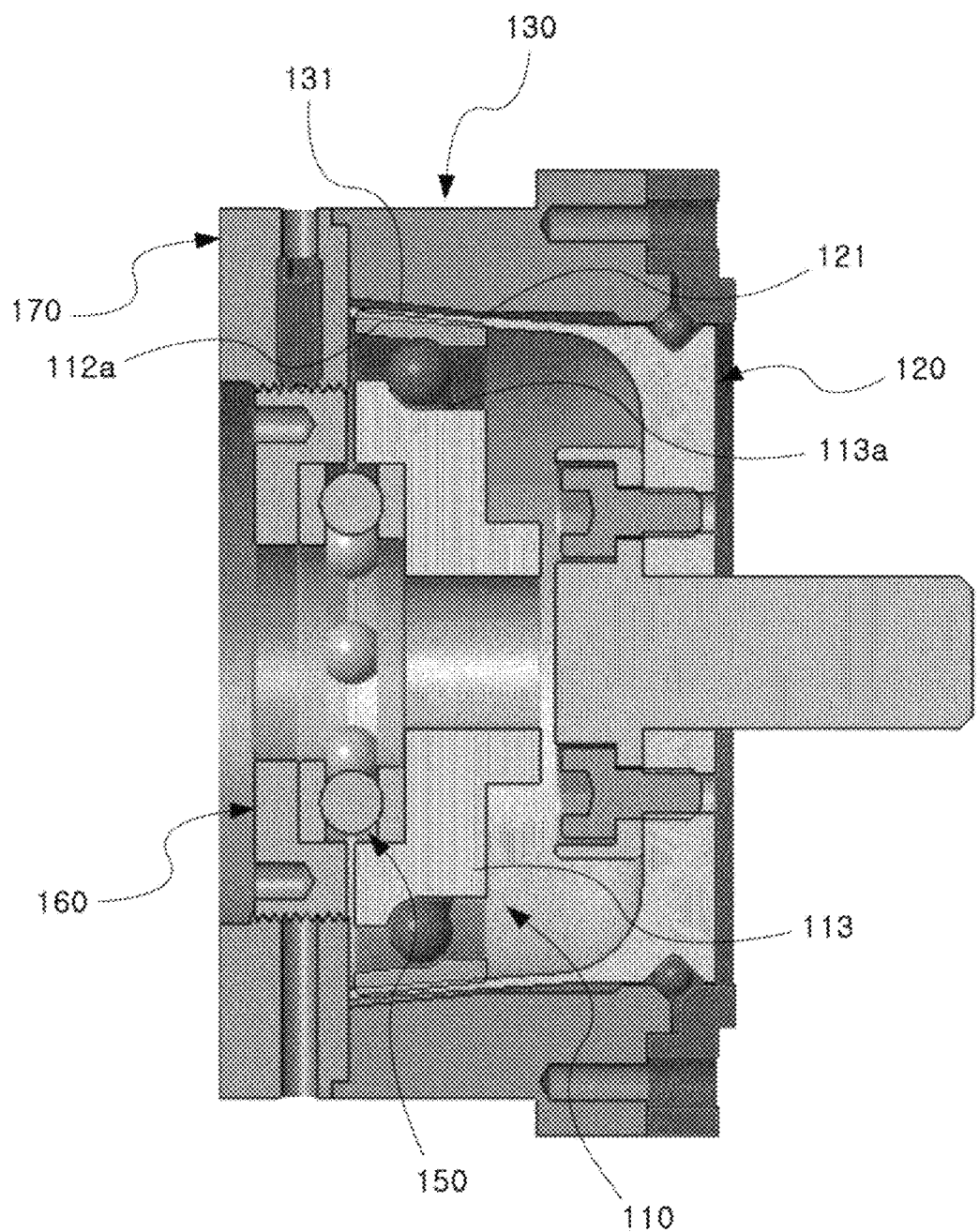

To realize such a frictional combination relationship in the present embodiment, a flexible bearing 111 on the side of the wave generator 110 is formed such that the outer circumferential face 112a of an outer race 112 thereof becomes an inclined face with a higher left side and a lower right side, that is, a conic pressurizing face, to apply pressure to the flex spline 120 in contact with the outer side of the flexible bearing 111 in the vertical direction, as illustrated in FIG. 5 and FIG. 6.

The pressure is applied by a plug 160 that pressurizes a cam 113 of the wave generator 110 in the axial direction by means of a thrust bearing 150. To this end, it is desirable that the flexible bearing 111 be an angular contact type capable of delivering axial force in a radial direction, as illustrated, and a flexible bearing or a tapered rolling bearing having other conic bearing rings is applicable.

In particular, the flexible bearing 111 and the cam 113 are integrally formed such that the outer circumferential face 113a of the cam 113 has the shape and function of the inner race of the flexible bearing 111 in the present embodiment.

The plug 160 is configured such that the force applied by the plug 160 to the cam 113 is controllable. In the present embodiment, the plug 160 is combined with the inner side of an intermediate plate 170 for motor mounting, which is combined with one side of the circular spline 130 on the outer side in the axial direction, and the inner circumferential face of the intermediate plate 170 and the outer circumferential face of the plug 160 are combined with each other through screw joining such that the force applied to the cam 113 according to control of rotation of the plug 160 is controlled. Accordingly, the pressure applied by the outermost conic pressurizing face 112a to the flex spline 120 can be controlled.

Here, the flexible bearing 111 may be a ball bearing as illustrated but it may be replaced with a roller bearing when it needs to deliver relatively strong force.

The flex spline 120 has a conic friction tube 121 with a wider left side and a narrower right side corresponding to the conic pressurizing face 112a. Accordingly, the conic pressurizing face 112a is inscribed in the conic friction tube 121 in contact therewith. Since teeth are not formed on the conic friction tube 121, the flex spline 120 having this conic friction tube 121 is called a "toothless" flex spline.

In addition, the circular spline 130 on the outer side has an internal conic friction face 131 with a wider left side and a narrower right side on the inner circumferential face thereof corresponding to the conic friction tube 121. Since teeth are not formed on the internal conic friction face 131, the circular spline 130 having this internal conic friction face 131 is called a "toothless" circular spline.

Accordingly, the conic friction tube 121 and the internal conic friction face 131 come into contact with (i.e., come into internally contact with) each other at two or more axially symmetrical points according to the shape of the cam 113 of the wave generator 110.

Consequently, the toothless flex spline 120 and the toothless circular spline 130 form an internal friction wheel in contact with each other at a plurality of points and achieve a reduction gear ratio according to a length difference therebetween in the circumferential direction.

Figure 7:
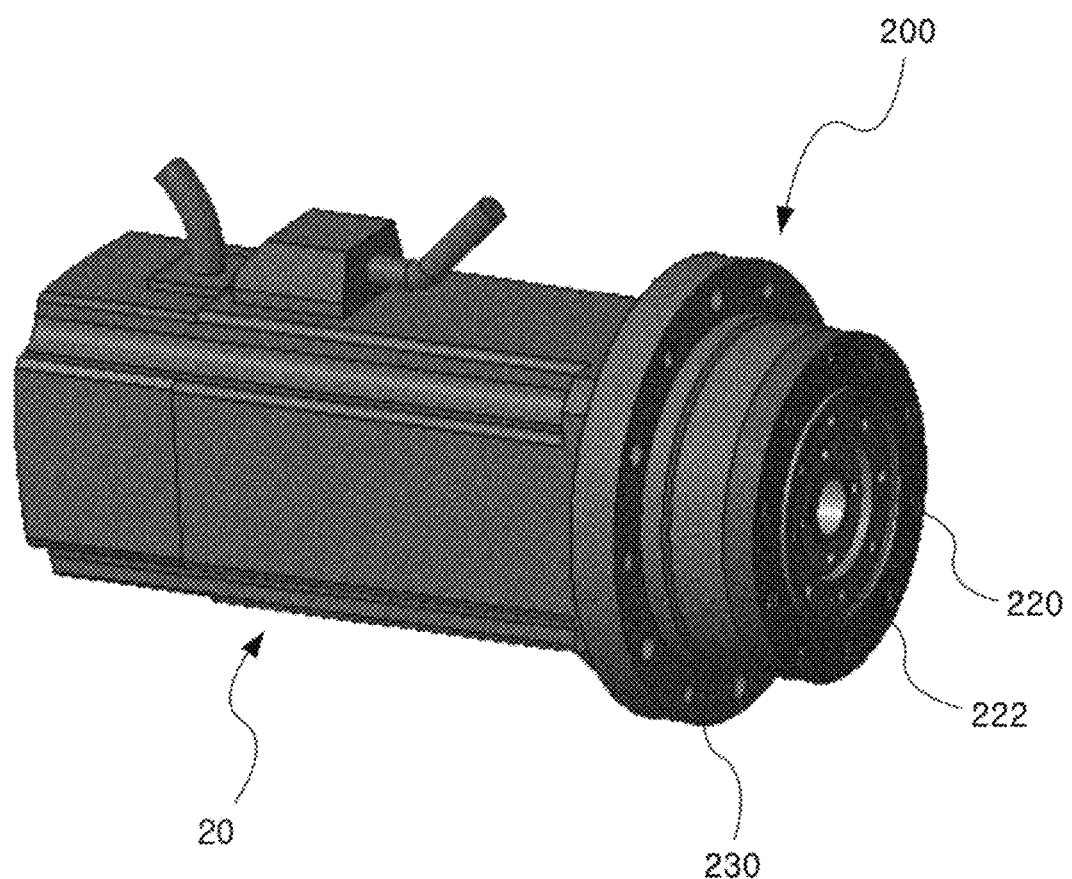
FIG. 7 and FIG. 8 are a perspective view and a cross-sectional view of a combination of a frictional wave reducer and a motor according to a second embodiment of the present disclosure.
Figure 8:
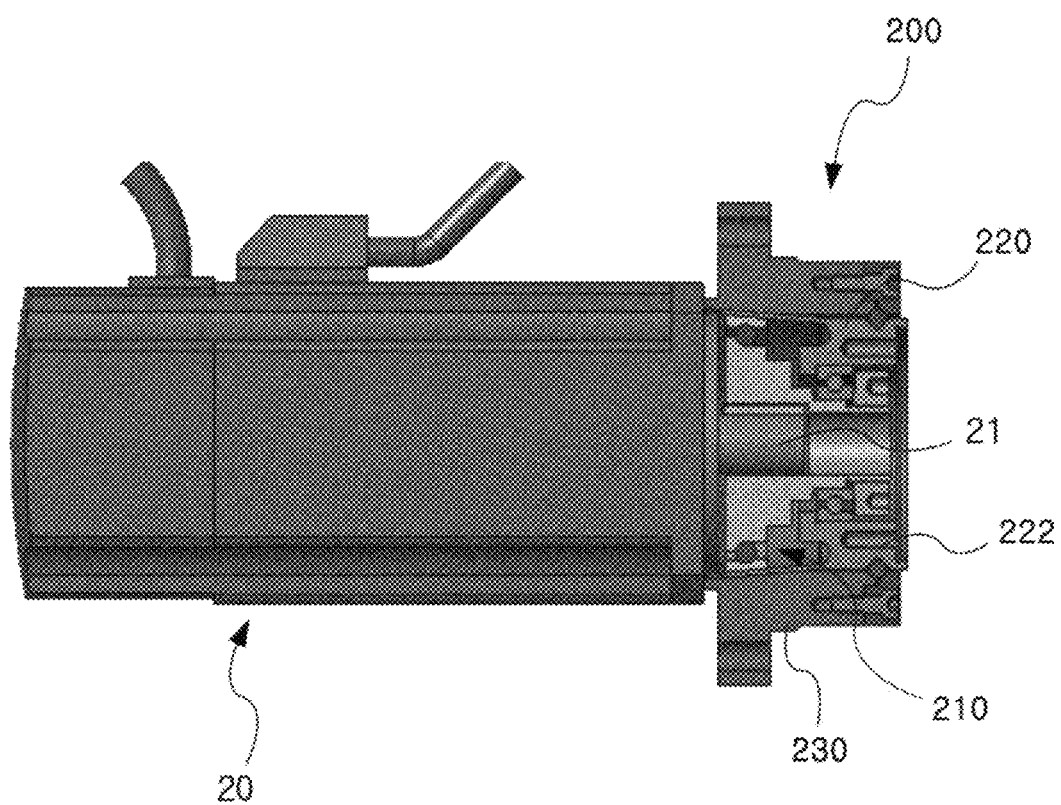

A frictional wave reducer 200 according to a second embodiment of the present disclosure is substantially the same as the conventional strain wave gearing (refer to 10 in FIG. 1 and FIG. 2) in that a wave generator 210 is combined with and integrally rotate along with a drive shaft 21 of a motor 20 combined with one side of the frictional wave reducer 200, and an elastic flex spline 220 enclosing the wave generator 210 is deformed in accordance with the shape of the rotating wave generator 210 (refer to FIG. 2) and rotates at a specific rate in a reverse direction with respect to a circular spline 230 on the outer side thereof to achieve a reduction gear ratio of an output shaft 222, as illustrated in FIG. 7 and FIG. 8.

However, the frictional wave reducer according to the present embodiment differs from the conventional strain wave gearing in that the flex spline 220 and the circular spline 230 according to the present embodiment are in a frictional combination relationship according to surface-to-surface contact whereas the conventional flex spline (12 in FIG. 1) and circular spline (13 in FIG. 1) are gearing with each other.

Figure 9:
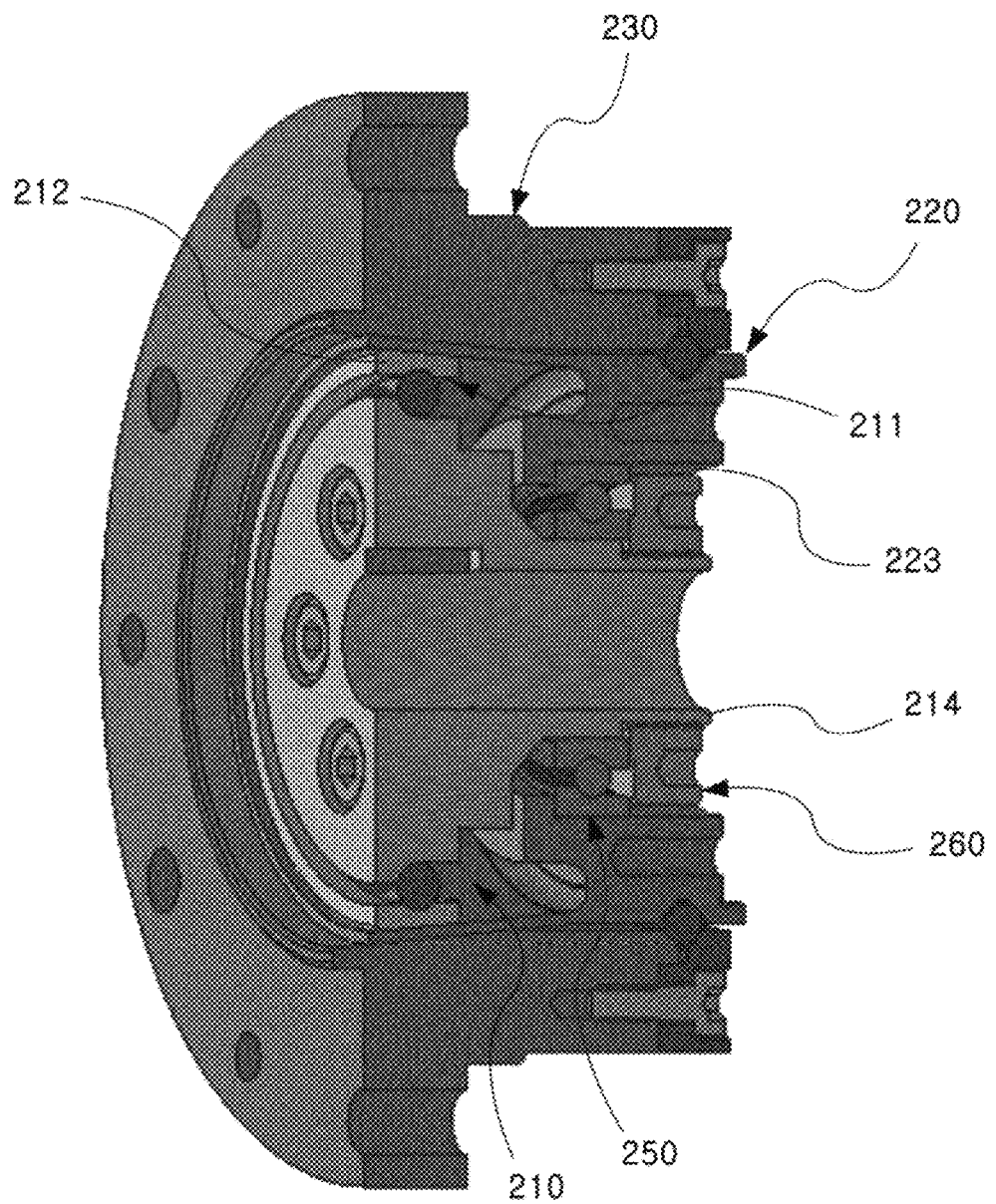
FIG. 9 and FIG. 10 are an enlarged perspective view and cross-sectional view illustrating a frictional wave reducer separated from FIG. 8.
Figure 10:
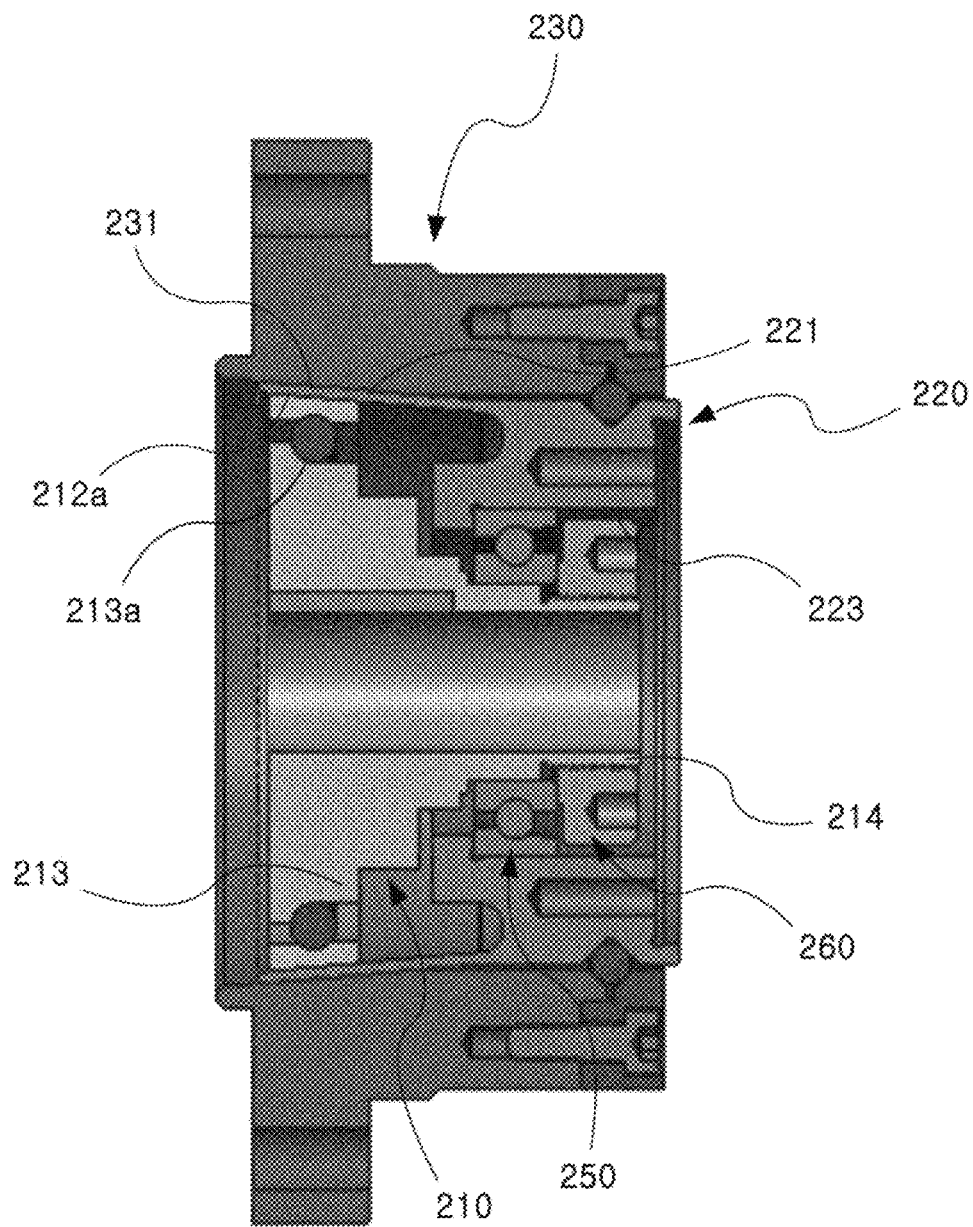

To realize such a frictional combination relationship in the present embodiment, a flexible bearing 211 on the side of the wave generator 210 is formed such that the outer circumferential face 212a of the outer race 212 thereof becomes an inclined face with a higher left side and a lower right side, that is, a conic pressurizing face, to apply pressure to the flex spline 220 in contact with the outer side of the flexible bearing 211 in the vertical direction, as illustrated in FIG. 9 and FIG. 10.

The pressure is applied by a plug 260 that pulls an extension shaft 214 extending from the center of the wave generator 210 in the axial direction. To this end, a bearing 250 is inserted in contact with a cylinder face 223 formed at the center of the flex spline 220 to rotatably support the extension shaft 214 on the inner side. The plug 260 combined with the extension shaft 214 pulls the wave generator 210 by coming into contact with the inner race of the bearing 250 in the axial direction. Here, the bearing 250 may be an angular contact type, and a thrust bearing may be employed according to the shape of the center part of the flex spline 220.

It is desirable that the flexible bearing 211 be an angular contact type capable of delivering axial force to the radial direction, as illustrated, and other flexible bearing or tapered rolling bearing having conic races is also applicable.

In particular, the flexible bearing 211 and a cam 213 are integrally formed such that the outer race 213a of the cam 213 has the shape and function of the inner race of the flexible bearing 211 in the present embodiment.

The plug 260 is configured such that the force of the plug 260 pulling the wave generator 210 in the axial direction is controllable. In the present embodiment, the force of the plug 260 pulling the wave generator 210 (i.e., tension) is controlled according to control of rotation of the plug 260 by combining the inner circumferential face of the plug 260 with the outer circumferential face of the extension shaft 214 through screw joining. Accordingly, pressure applied by the outermost conic pressurizing face 212a to the flex spline 220 can be controlled.

Here, the flexible bearing 211 may be a ball bearing as illustrated but it may be replaced with a roller bearing when it needs to deliver relatively strong force.

The flex spline 220 has a conic friction tube 221 with a wider left side and a narrower right side corresponding to the conic pressurizing face 212a. Accordingly, the conic pressurizing face 212a is inscribed in the conic friction tube 221 in contact therewith. Since teeth are not formed on the conic friction tube 221, the flex spline 220 having this conic friction tube 221 is called a "toothless" flex spline.

In addition, the circular spline 230 on the outer side has an internal conic friction face 231 with a wider left side and a narrower right side on the inner circumferential face thereof corresponding to the conic friction tube 221. Since teeth are not formed on the internal conic friction face 231, the circular spline 230 having this internal conic friction face 231 is called a "toothless" circular spline.

Accordingly, the conic friction tube 221 and the internal conic friction face 231 come into contact with (i.e., come into internally contact with) each other at two or more axially symmetrical points according to the shape of the cam 213 of the wave generator 210.

Consequently, the toothless flex spline 220 and the toothless circular spline 230 form an internal friction wheel in contact with each other at a plurality of points and achieve a reduction gear ratio according to a length difference therebetween in the circumferential direction.

Figure 11:
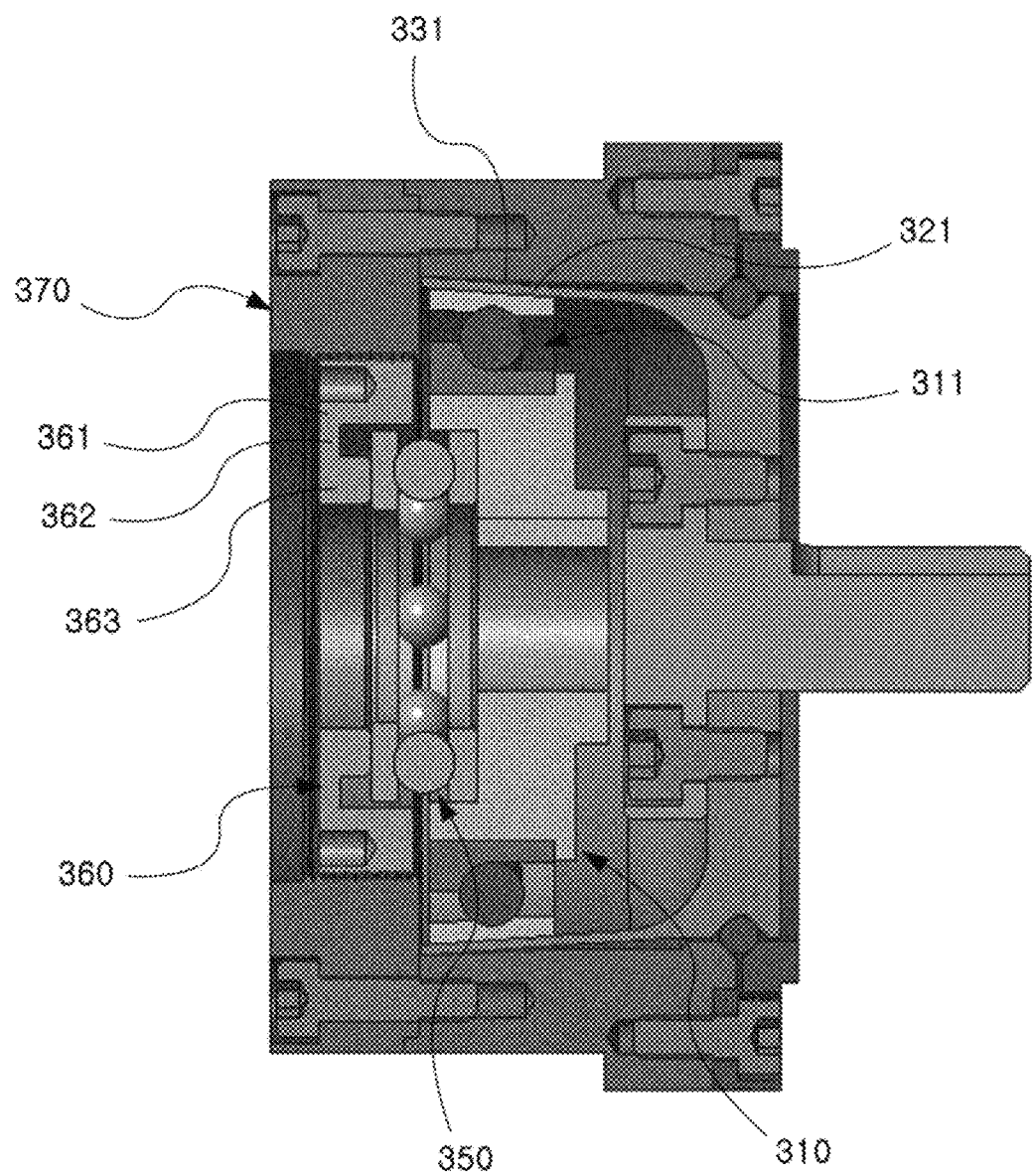
FIG. 11 and FIG. 12 are cross-sectional views illustrating modified examples of FIG. 6.
Figure 12:
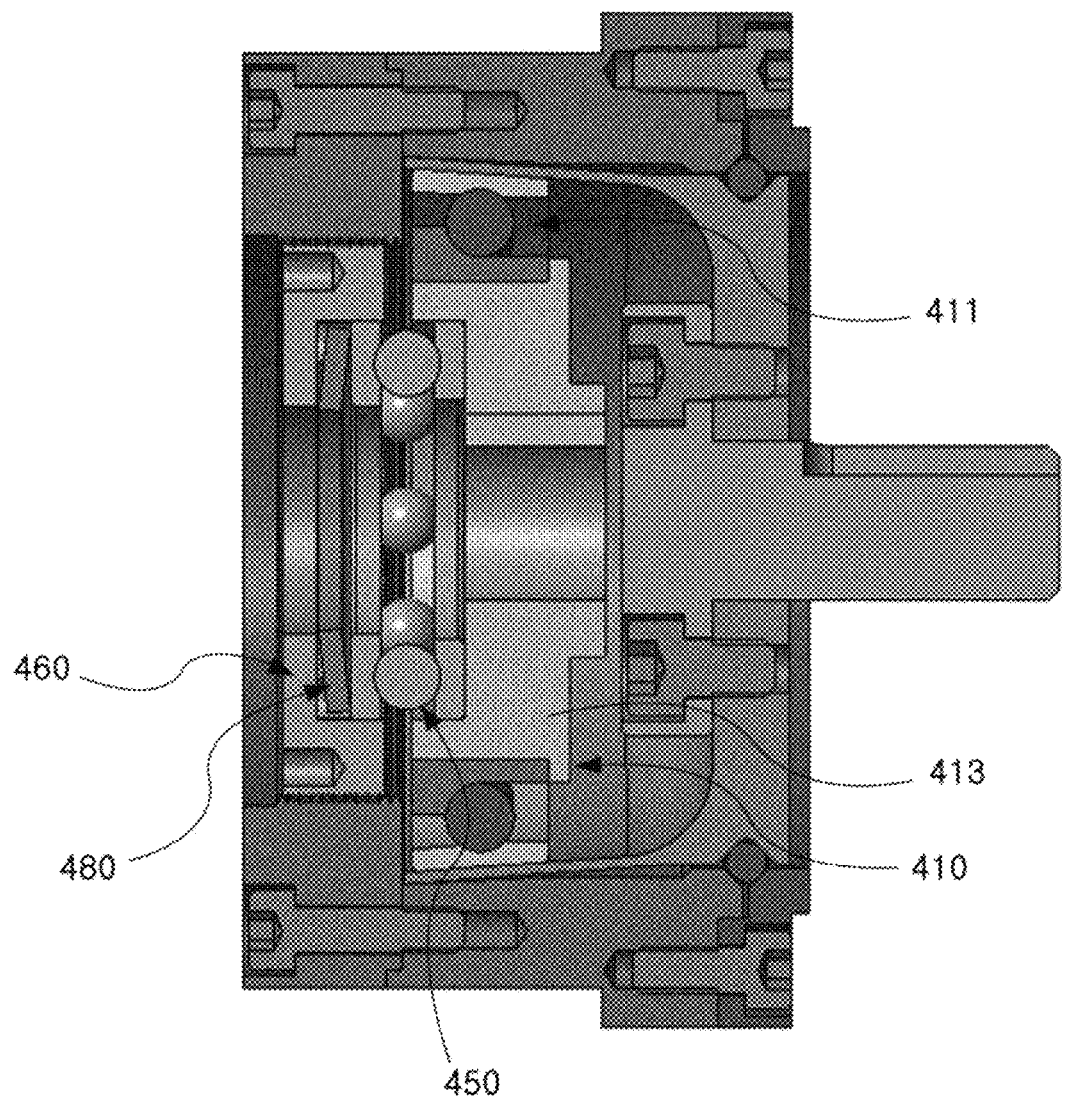

FIG. 11 illustrates a modified example of the frictional wave reducer according to the above-described first embodiment (refer to FIG. 6), in which a plug 360 includes a rim 361 having an outer circumferential face combined with the inner circumferential face of an intermediate plate 370 through screw joining, an elastic flange 362 inwardly extending from the inner circumferential face of the rim 361, and a hub 363 formed at an inner edge to pressurize a thrust bearing 350 through one edge in the axial direction.

In this configuration, as the rim 361 combined with the intermediate plate 370 through screw joining is additionally fastened such that the rim 361 gradually advances (to the right), the pressurizing force applied by the hub 363 to the wave generator 310 through the thrust bearing 350 gradually increases and the elastic flange 362 is elastically deformed in the opposite axial direction (to the left in the figure) in proportion to the pressurizing force. This is equivalent to a state in which spring force corresponding to the pressurizing force is stored in the elastic flange 362.

Accordingly, even when frictional pressurizing force is reduced due to fine abrasion caused by frictional rotation for a long time at the flexible bearing 311, the frictional pressurizing force reduction is automatically corrected according to the axial pressurizing force applied by the elastic flange 362 and thus the contact force between the conic friction tube 321 and the internal conic friction face 331 can always be maintained.

As another modified example for maintaining contact between such components, a configuration in which a disk spring 480 is interposed between a plug 460 and a thrust bearing 450 and pressurizing force is provided to the thrust bearing 450 and a wave generator 410 through the disk spring 480 may be employed.

The disk spring 480 is elastically compressively deformed in the axial direction in proportion of the pressurizing force, and restoring force accumulated in the disk spring 480 can automatically correct frictional pressurizing force reduction caused by abrasion at the part of a flexible bearing 411, as described above.

In addition, in the aforementioned modified example, a configuration in which the additional flexible bearing 411 including inner and outer races is provided on the outer circumferential face of a cam 413 of a wave generator 410, distinguished from the above configuration described with reference to FIG. 6, is employed, and thus the flexible bearing can be replaced with a new bearing in case of abrasion. Accordingly, a design in consideration of maintenance can be provided.

The above-described modified specifications may be applied to the frictional wave reducer (refer to FIG. 10) according to the second embodiment of the present invention.

Figure 13:
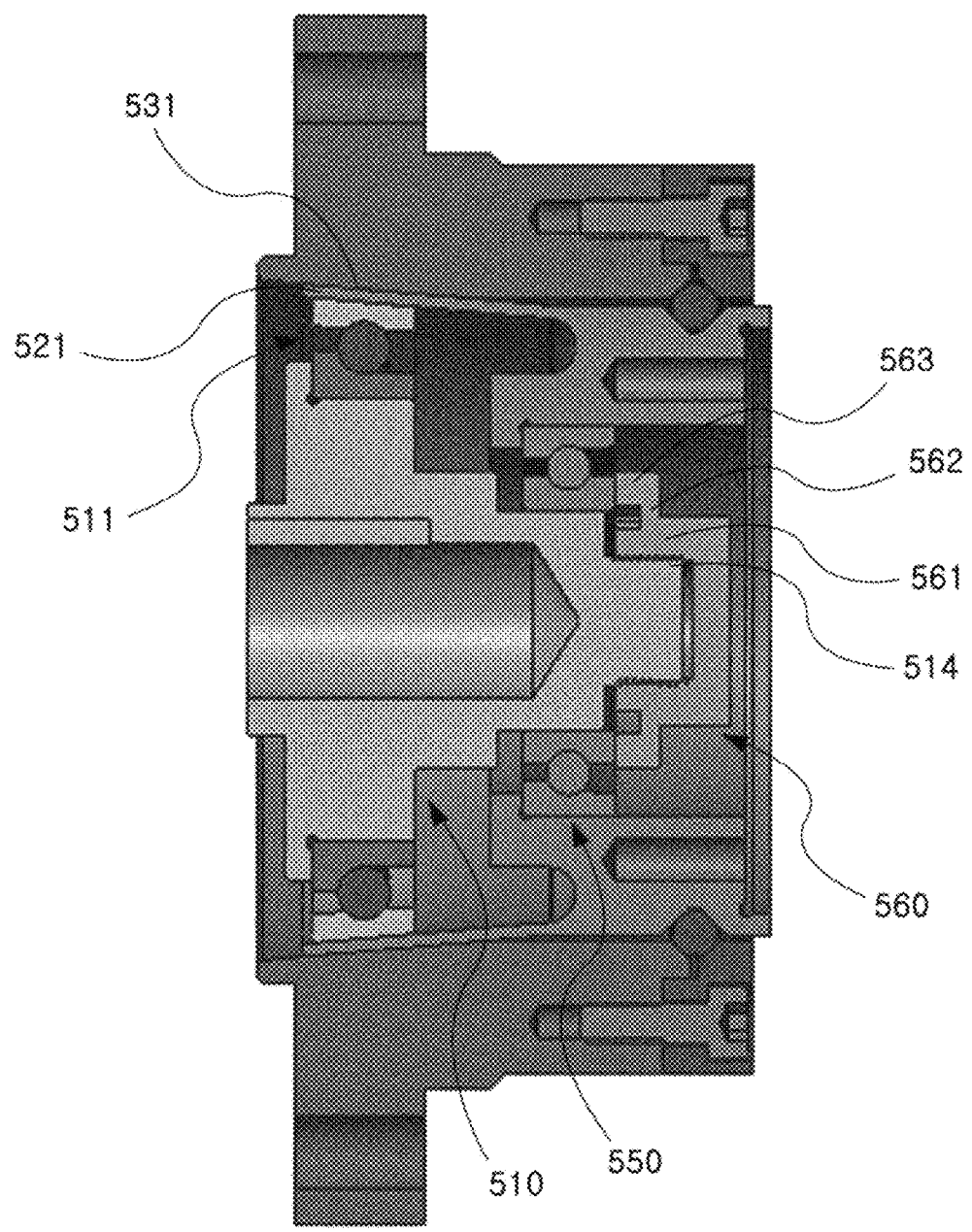
FIG. 13 and FIG. 14 are cross-sectional views illustrating modified examples of FIG. 10.

That is, as illustrated in FIG. 13, a plug 560 that is a means for pulling a wave generator 510 in the axial direction includes a hub 561 having an inner circumferential face combined with an outer circumferential face of an extension shaft 514 through screw joining, an elastic flange 562 outwardly extending from the outer circumferential face of the hub 561, and a rim 563 formed at the outer end of the elastic flange 562 and supported by a bearing 550 through one end in the axial direction.

Accordingly, even when a stepped portion is generated due to abrasion at the part of a flexible bearing 511, a contact force between a conic friction tube 521 and an internal conic friction face 531 can always be maintained according to axial tension accumulated due to deformation of the elastic flange 562.

Figure 14:
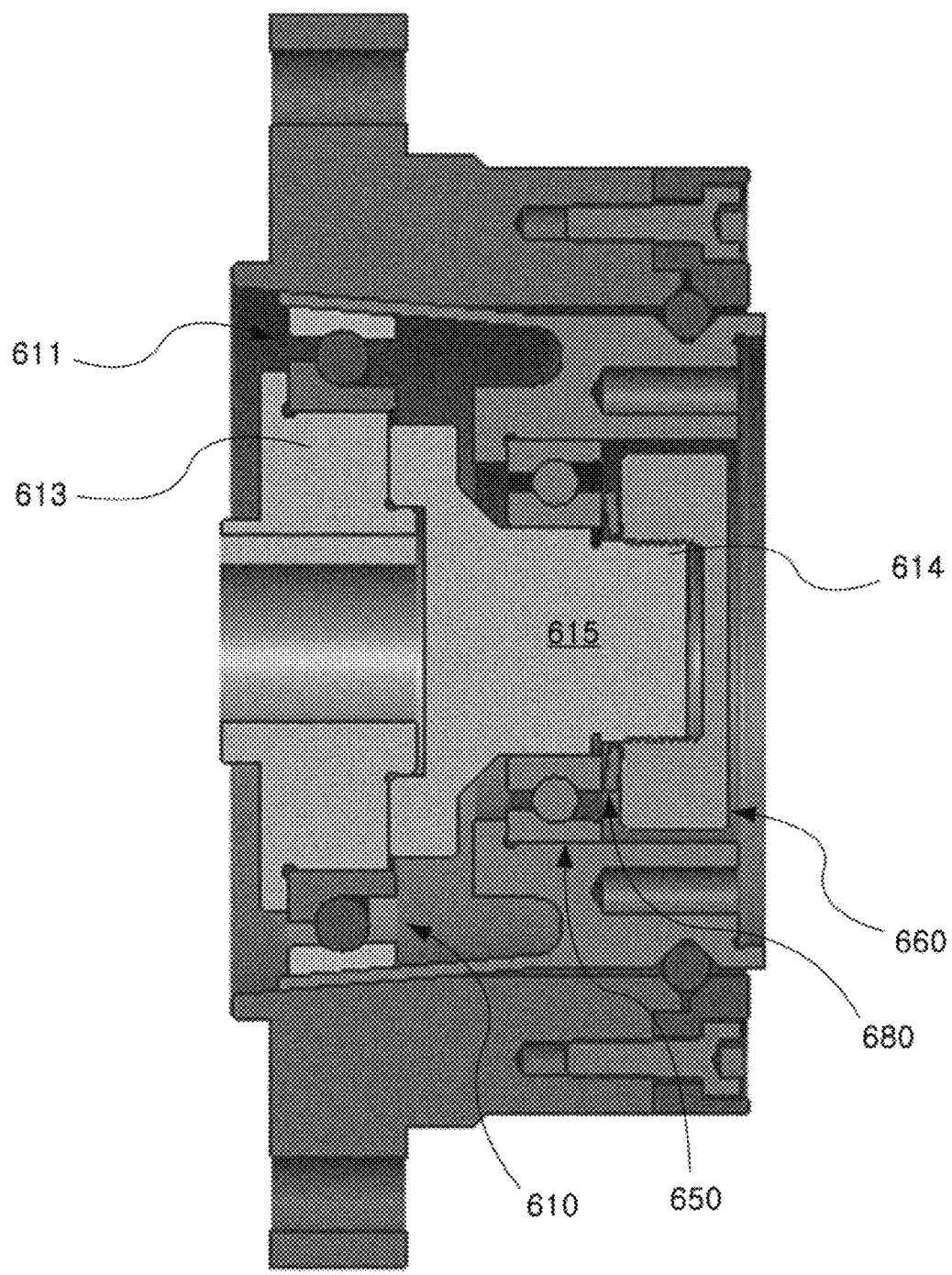

Furthermore, as in the above-described other modified example, a configuration in which a disk spring 680 is interposed between a plug 660 and a bearing 650 and tension is provided to a wave generator 610 through the disk spring 680, as illustrated in FIG. 14, may be employed.

In the present modified example, the wave generator 610 has a configuration in which an additional flexible bearing 611 including inner and outer races is provided on the outer circumferential face of a wave generating cam 613 and a configuration in which the wave generating cam 613 is detachably combined with a wave generating cam shaft 615 having an extension shaft 614 formed therein. Accordingly, a design in consideration of maintenance for damage for each part of the wave generator 610 can be provided.

The above-described frictional wave reducers are intended to aid in understanding of the present disclosure, and thus the scope and the technical scope of the present disclosure defined by the appended claims and equivalents thereto are not limited to the above description.

As described above, according to the frictional wave reducer according to the present disclosure, design or precision machining for forming teeth is not required because a conventional structure of engagement between a flex spline and a circular spline is changed to a frictional combination structure according to surface-to-surface contact. Consequently, the manufacturing cost is lower than that of the conventional Harmonic Drive to improve productivity. Particularly, even if the oval radius or outer shape dimension of the wave generator is not accurate, frictional contact between conic surfaces can be achieved by controlling the position of the wave generator in the axial direction, and thus burden for machining accuracy is low.

In addition, it is possible to provide an ultralight microreducer by overcoming the limitations on miniaturization due to conventional teeth. Furthermore, wear resistance and durability are improved because teeth are not formed.

Moreover, rotation accuracy is considerably high and backlash is not present within a rated capacity range having no relative slip caused by high surface pressure. Further, since there is no processing error or shape error of teeth, vibration or noise is hardly generated even in the case of high-speed rotation. In addition, expensive lubricant essential in the conventional gearing structure is not necessary.

What is claimed is:

1. A frictional wave reducer comprising:
a wave generator having a conic pressurizing face on the outermost side;
a toothless flex spline having a conic friction tube in which the wave generator is accommodated with the conic pressurizing face inscribed in the conic friction tube;
a toothless circular spline accommodating the toothless flex spline and having an internal conic friction face in which the conic friction tube is inscribed at a plurality of axially symmetrical points to form an internal friction wheel with the toothless flex spline;
a pressurizing means for generating frictional force between the conic friction tube and the internal conic friction face by pressurizing the wave generator in an axial direction,
wherein the pressurizing means includes a plug which pressurizes the wave generator by means of a thrust bearing; and
an intermediate plate for motor mounting which is combined with one end of the circular spline in the axial direction and accommodates the plug,
wherein an outer circumferential face of the plug and an inner circumferential face of the intermediate plate are combined with each other through screw joining such that pressurizing force applied by the plug to the wave generator is controllable.

2. The frictional wave reducer of claim 1, wherein the plug includes a rim having an outer circumferential face combined with the inner circumferential face of the intermediate plate through screw joining, an elastic flange inwardly extending from an inner circumferential face of the rim, and a hub formed at an inner edge of the elastic flange and pressurizing the thrust bearing through one edge in the axial direction, and the elastic flange is elastically deformed in an opposite axial direction in proportion to the pressurizing force through the hub.

3. The frictional wave reducer of claim 1, wherein the plug pressurizes the thrust bearing by means of a spring, and the spring is elastically compressively deformed in the axial direction in proportion to the pressurizing force.

4. A frictional wave reducer comprising:
a wave generator having a conic pressurizing face on the outermost side;
a toothless flex spline having a conic friction tube in which the wave generator is accommodated with the conic pressurizing face inscribed in the conic friction tube;
a toothless circular spline accommodating the toothless flex spline and having an internal conic friction face in which the conic friction tube is inscribed at a plurality of axially symmetrical points to form an internal friction wheel with the toothless flex spline;
a pulling means for pulling the wave generator in the axial direction to generate frictional force between the conic friction tube and the internal conic friction face,
wherein the pulling means includes an extension shaft extending from the wave generator in the axial direction and passing through the center of the flex spline, a bearing rotatably supporting the extension shaft with respect to the flex spline, and a plug combined with the extension shaft to come into contact with the bearing to be supported in the axial direction;
wherein an inner circumferential face of the plug and an outer circumferential face of the extension shaft are combined with each other through screw joining such that tension applied by the plug to the wave generator is controllable; and
wherein the plug includes a hub having an inner circumferential face combined with the outer circumferential face of the extension shaft through screw joining, an elastic flange outwardly extending from an outer circumferential face of the hub, and a rim formed at an outer edge of the elastic flange and supported by the bearing through one edge in the axial direction, and the elastic flange is elastically deformed in an opposite axial direction in proportion to the tension through the hub.

5. A frictional wave reducer comprising:
a wave generator having a conic pressurizing face on the outermost side;

a toothless flex spline having a conic friction tube in which the wave generator is accommodated with the conic pressurizing face inscribed in the conic friction tube;

a toothless circular spline accommodating the toothless flex spline and having an internal conic friction face in which the conic friction tube is inscribed at a plurality of axially symmetrical points to form an internal friction wheel with the toothless flex spline;

a pulling means for pulling the wave generator in the axial direction to generate frictional force between the conic friction tube and the internal conic friction face, wherein the pulling means includes an extension shaft extending from the wave generator in the axial direction and passing through the center of the flex spline, a bearing rotatably supporting the extension shaft with respect to the flex spline, and a plug combined with the extension shaft to come into contact with the bearing to be supported in the axial direction;

wherein an inner circumferential face of the plug and an outer circumferential face of the extension shaft are combined with each other through screw joining such that tension applied by the plug to the wave generator is controllable; and wherein the plug is supported by the bearing by means of a spring, and the spring is elastically compressively deformed in proportion to the tension.

* * * * *